United States Patent
Hsu et al.

(10) Patent No.: US 8,407,262 B2
(45) Date of Patent: Mar. 26, 2013

(54) SYSTEMS AND METHODS FOR GENERATING AN ENTITY DIAGRAM

(75) Inventors: Shao-Hsin Hsu, Hsinchu (TW); Chih-Ping Sun, Hsinchu (TW); Zhi-Hua Sun, Hsinchu (TW); Jia-Bin Yian, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 504 days.

(21) Appl. No.: 11/896,209

(22) Filed: Aug. 30, 2007

(65) Prior Publication Data

US 2009/0063545 A1 Mar. 5, 2009

(51) Int. Cl.
*G06F 17/30* (2006.01)
(52) U.S. Cl. .............. 707/803; 707/790; 707/E17.048
(58) Field of Classification Search ............ 707/709, 707/999.1
See application file for complete search history.

(56) References Cited

U.S. PATENT DOCUMENTS

| | | | |
|---|---|---|---|
| 6,154,220 | A | 11/2000 | Prakriya et al. |
| 6,801,200 | B1 | 10/2004 | Prakriya et al. |
| 6,880,127 | B1 | 4/2005 | Arquie |
| 7,024,419 | B1 | 4/2006 | Klenk et al. |
| 7,210,112 | B2 | 4/2007 | DeHon et al. |
| 2002/0161744 | A1* | 10/2002 | Gluckman ................. 707/1 |
| 2008/0098008 | A1* | 4/2008 | Eid ........................ 707/100 |

* cited by examiner

*Primary Examiner* — Anteneh Girma
(74) *Attorney, Agent, or Firm* — Finnegan, Henderson, Farabow, Garrett & Dunner, LLP

(57) ABSTRACT

Methods and systems for generating an entity diagram include, in one exemplary embodiment, a user using a processor that executes the program code to generate the entity diagram. The process for generating the entity diagram includes generating an entity diagram with one or more entities and one or more relationships, grouping the one or more entities by a first dimension, and grouping the one or more entities by a second dimension. The process further includes rearranging the groups based on the grouping according to the first dimension, rearranging the entities based on the grouping according to the second dimension, and adjusting one or more relationship links corresponding to the one or more relationships. After the one or more entities and relationships are rearranged and adjusted, the user may access an updated entity diagram.

35 Claims, 13 Drawing Sheets

SYSTEMS AND METHODS FOR GENERATING AN ENTITY DIAGRAM

TECHNICAL FIELD

This disclosure relates generally to data presentation. More particularly, this disclosure relates to systems and methods for providing an entity diagram.

BACKGROUND

Entity diagrams, such as entity relationship diagrams, are frequently used to enable a targeted audience to comprehend complex relationships between various entities. An entity diagram may include one or more entities and one or more relationships among the entities. An entity may refer to any object that can be described by data. For example, an entity may be a database record, a computer programming object, or a business object such as a business organization or a business process.

Entity diagrams can be most valuable when they depict a large number of entities and relationships. For example, a complex database design may be presented as a large entity diagram denoting the structure of various data models. The value of an entity diagram with a large number of entities may be severely diminished when a user cannot easily understand the relationships among the entities, or when a user has to spend a significant effort to manipulate the nodes and relationship links to make the diagram comprehensible. As such, improving the layout of a complex entity diagram can be a useful step in the process of producing a clear and concise diagram.

The process of generating a complex entity diagram may be complicated by the presence of a large number of nodes and a large number of relationships in the diagram. Because of complex relationships among the nodes that represent the entities, related nodes may be dispersed over a wide area of the entity diagram. Dispersed nodes make the relationship links excessively long in the entity diagram, possibly making the diagram difficult to read.

The process of generating a complex entity diagram is further complicated by the variety of logical relationships that exist among the entities represented in the diagram. For example, in a large entity diagram, the cardinalities of the entities (e.g., one-to-one, one-to-many, and many-to-many relationships) require various types of denotations. Numerous and complex logical relationships in an entity diagram may be presented using relationship links that overlap or cross each other, making the diagram appear cluttered.

Methods and systems consistent with the disclosed embodiments address one or more of the above-mentioned problems.

SUMMARY OF THE INVENTION

Methods and systems for generating an entity diagram are disclosed. In one exemplary embodiment, a user may use a processor to execute program code to generate the entity diagram. The process for generating the entity diagram includes generating the entity diagram with one or more entities and one or more relationships, grouping the one or more entities by a first dimension into one or more groups, and grouping the one or more entities by a second dimension into one or more groups. The process further includes rearranging the entities based on the grouping according to the first dimension, rearranging the entities based on the grouping according to the second dimension, and adjusting one or more relationship links corresponding to the one or more relationships. After the one or more entities and relationships are rearranged and adjusted, the user may access an updated entity diagram.

BRIEF DESCRIPTION OF THE DRAWINGS

The accompanying drawings, which are incorporated in and constitute a part of this specification, illustrate exemplary embodiments and, together with the description, serve to explain these disclosed embodiments. In the drawings.

DETAILED DESCRIPTION

Reference will now be made in detail to the disclosed exemplary embodiments, examples of which are illustrated in the accompanying drawings. Wherever possible, the same reference numbers will be used throughout the drawings to refer to the same or like parts.

Methods and systems consistent with the disclosed embodiments may relate to an electronic data processing system, such as an EDP system, for creating one or more entity diagrams. An entity diagram may be any type of diagram that provides information for a set of entities and the relationships among the entities. For example, the entity diagram may be an entity relationship diagram, a flow chart, an organization chart, etc. An entity diagram layout refers to a specific arrangement of the entities and the relationships in the entity diagram. Depending on the arrangements of the entities and relationships, the entity diagram may correspond to one or more entity diagram layouts. Applications of the disclosed embodiments, however, are not limited to any particular type of entity diagram.

Entities in an entity diagram may be visually presented as nodes, textboxes, or other representations hereinafter collectively referred to as nodes. An entity relationship may refer to how two or more entities are related to one another. The relationship (connection) among the entities may be visually presented as a relationship link such as a solid line. A relationship link, such as a line, may also be presented with relationship marks or connectors connecting the related entities. For example, a relationship mark may be an arrow connecting the nodes that represent the entities.

Figure 1:
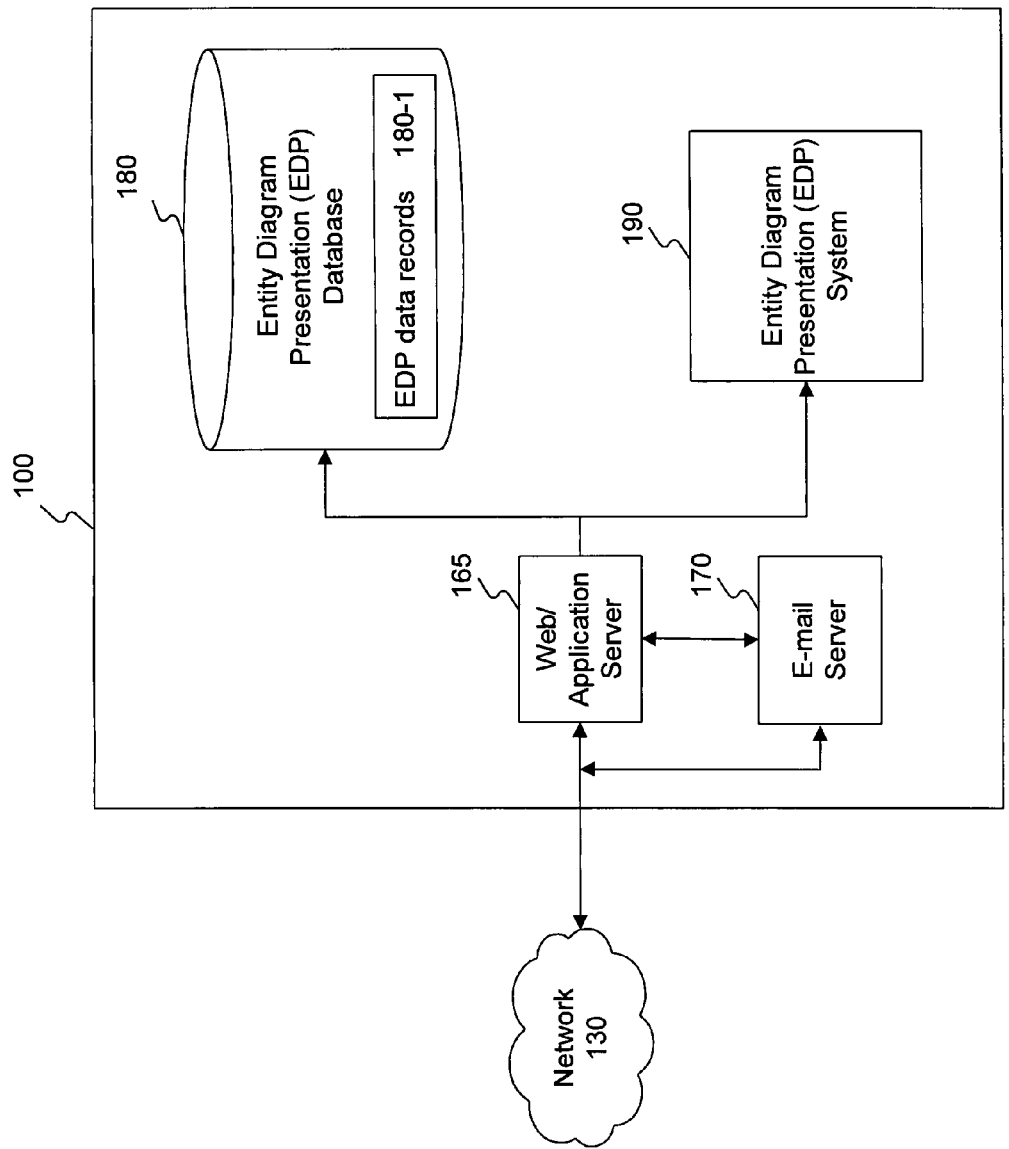
FIG. 1 is a block diagram of an exemplary entity diagram presentation ("EDP") system consistent with certain disclosed embodiments.

FIG. 1 is a block diagram illustrating an EDP architecture 100 consistent with certain disclosed embodiments. As shown in FIG. 1, an EDP architecture 100 may include a web/application server 165, an e-mail server 170, an EDP database 180, and an EDP system 190. Web/application server 165 and e-mail server 170 interface with a network 130. Web/application server 165 may also be connected to e-mail server 170, EDP database 180, and EDP system 190. It is contemplated that EDP architecture 100 may include additional or fewer components than those shown in FIG. 1.

EDP architecture 100 may be a computer system including hardware/software that enables collaboration among users of EDP architecture 100, such as one or more data analysts. In one exemplary embodiment, a data analyst may be responsible for generating one or more entity diagrams. An entity diagram may include one or more entities and one or more relationships among the entities.

A user of EDP architecture 100 may be any individual, software application, and/or system that uses the features of EDP architecture 100. A user of EDP architecture 100 may generate, maintain, update, delete, and present entity data records and entity data change entries. An entity data record may include any data related to creating and presenting an entity diagram processed by EDP architecture 100.

Each component of EDP architecture 100 may exchange data via network 130. Network 130 may be the Internet, a wireless local area network (LAN), or any other type of network. Thus, network 130 may be any type of communications system. Each user of EDP architecture 100 may provide inquiries or respond to inquiries using network 130.

Web/application server 165 may include an interface that allows users to access and edit data records in EDP database 180 and/or EDP system 190. Further, web/application server 165 may generate a notification, such as an e-mail, that is sent to one or more users of EDP architecture 100. The notification may indicate that the EDP architecture 100 has completed an operation or a record has been received. The notification may also indicate that the operation or record is available for review.

Web/application server 165 may also include additional components, such as software communication tools that permit collaboration of users of EDP architecture 100, bulletin boards to permit users to communicate with each other, and/or search engines to provide efficient access to specific entries in EDP database 180 or EDP system 190. In one embodiment, web/application server 165 may be the Apache HTTP Server from the Apache Software Foundation, IBM WebSphere, or any other web/application server known in the art.

E-mail server 170 may be a computer system or software executed by a processor that is configured to provide e-mail services for users of EDP architecture 100. The e-mail services may provide messages including current information from EDP architecture 100. For example, when a specific entity diagram is updated, a data analyst may use e-mail server 170 to send messages to other users of EDP architecture 100.

EDP database 180 may be a database system and/or software executed by a processor that is configured to store data records, entries for changes made to the data records, and other information used by users of EDP architecture 100. EDP architecture 100 may include one or more EDP databases 180.

In one exemplary embodiment, EDP database 180 may store one or more EDP data records 180-1. EDP data record 180-1 may include information defining entities in one or more entity diagrams. For example, EDP data record 180-1 may include information indicating that a group of entities are business entities, such as a group of companies. EDP data record 180-1 may include information defining logical relationships among a plurality of entities. For example, EDP data record 180-1 may include information indicating a first entity that has a one-to-one relationship with a second entity. EDP data record 180-1 may also include information regarding one or more attributes of an entity and/or a relationship among the entities. For example, EDP data record 180-1 may indicate that an entity (e.g., a company) may have a location attribute (e.g., headquarter location).

EDP system 190 may be a computer system or software executed by a processor that is configured to provide access to data records stored in a number of different formats, such as a word processing format, a spreadsheet format, presentation format, and the like. EDP system 190 may facilitate capture of EDP data records 180-1 and changes to EDP data records 180-1, by hosting a process that facilitates the activities of users of EDP architecture 100. EDP system 190 may also enable users of EDP architecture 100 to define and delete EDP data record 180-1 and the like.

In one exemplary embodiment, EDP system 190 may enable a data analyst to create, update, and delete EDP data records 180-1. The data analyst may use EDP system 190 to create a set of entities, a set of relationships among the entities, and one or more entity diagrams. The EDP system 190 may improve the layout of an entity diagram by rearranging the entities and relationships among the entities. The exemplary process of generating an entity diagram is described in detail in FIGS. 2A-11.

Figure 2A:
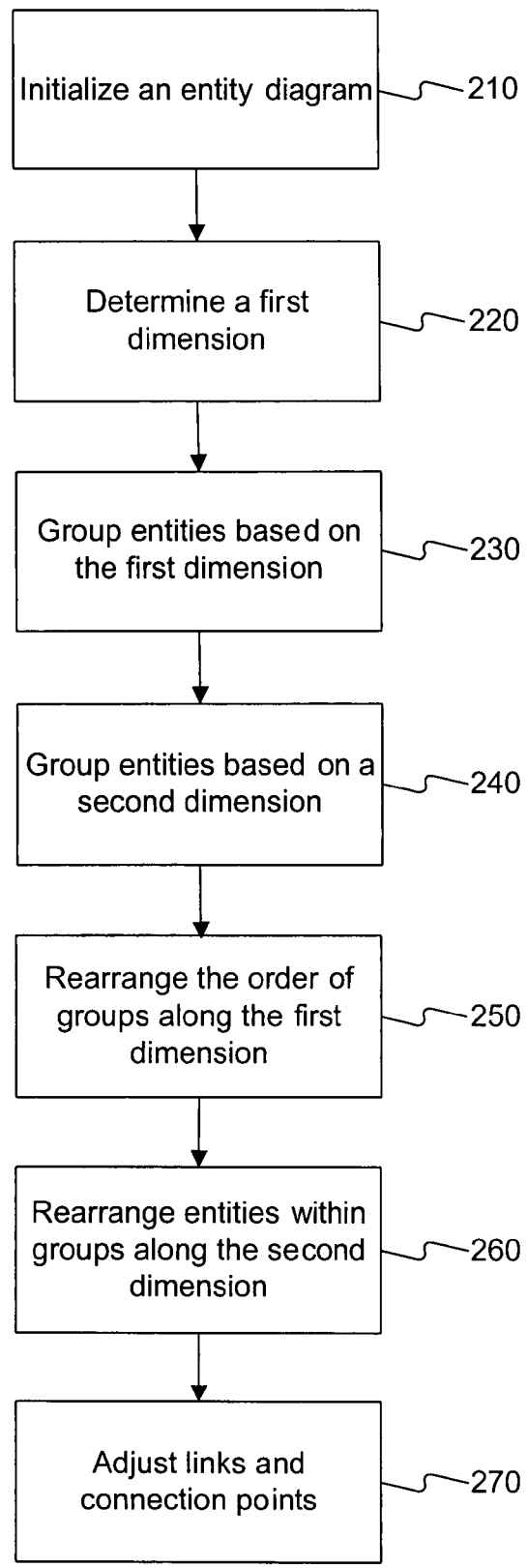
FIG. 2A is a flow chart of an exemplary process of presenting an entity diagram consistent with certain disclosed embodiments.
Figure 2B:
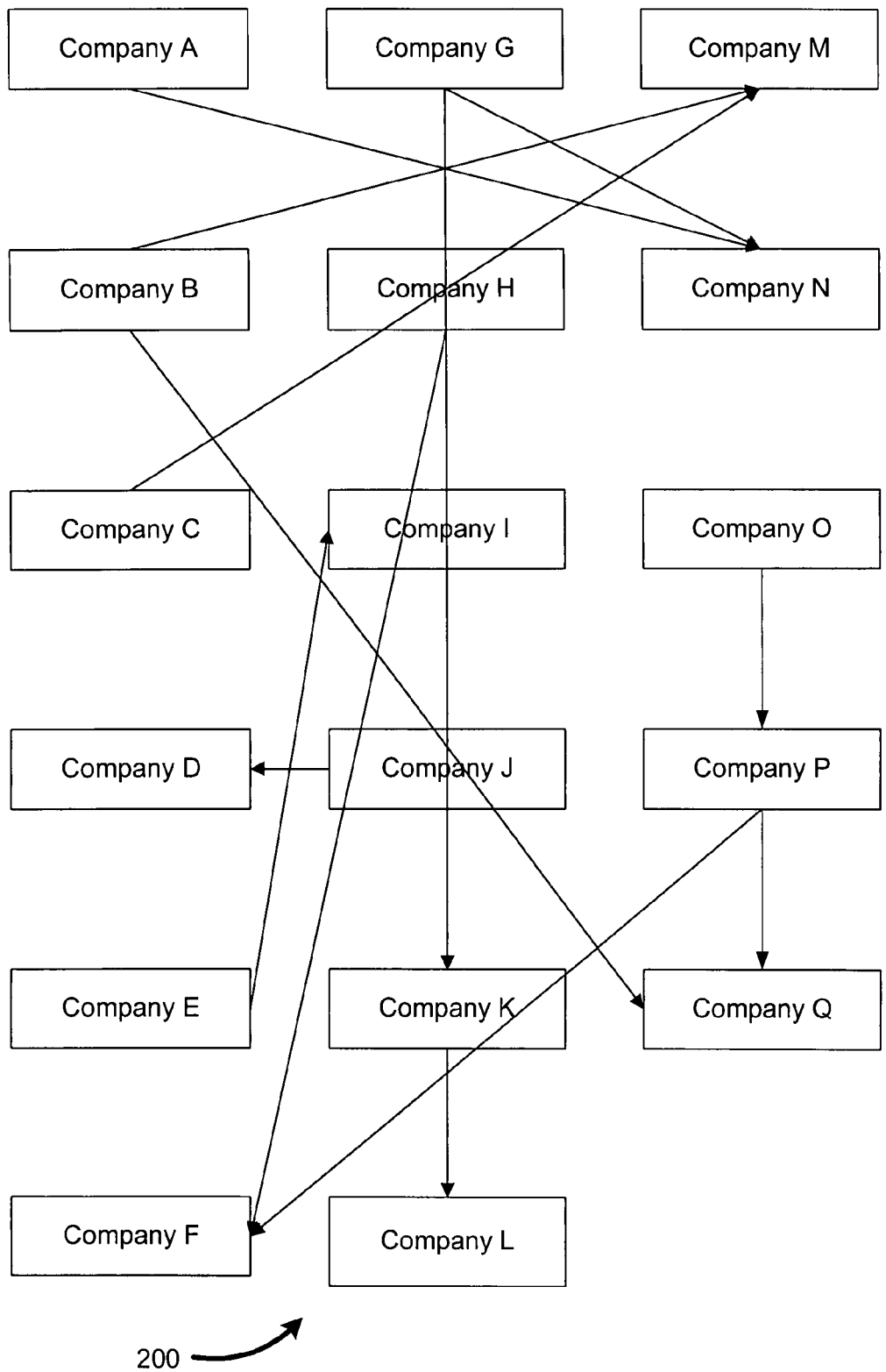
FIG. 2B is an exemplary entity diagram consistent with certain disclosed embodiments.

FIGS. 2A and 2B illustrate an exemplary process of generating an entity diagram consistent with certain disclosed embodiments. FIGS. 3-11 illustrate processes and interim entity diagram improvements corresponding to various steps depicted in FIG. 2A. Further, various interim entity diagrams such as those shown in FIGS. 2B, 3, 5, 7, 9, and 11 may be used to illustrate interim steps taken by EDP system 190 to generate an entity diagram. Depending on the specific embodiments of EDP system 190, these interim diagrams may or may not be generated and presented to a user of EDP system 190 through a graphic user interface.

With respect to FIG. 2A, in one embodiment, a data analyst may start the process of generating an entity diagram by selecting the entities for the requested diagram. Alternatively, the data analyst may apply one or more default rules to select the entities of the requested diagram. Upon request, EDP system 190 may initialize the requested entity diagram (step 210). EDP system 190 may retrieve all EDP data records defining the entities and the relationships among the entities in the requested entity diagram from EDP database 180. EDP system 190 may generate an initial version of the entity diagram presenting the entities and relationships among the entities. EDP system 190 may present the initial version of the entity diagram through a user interface if requested by the data analyst.

For example, the data analyst may request EDP system 190 to generate an entity diagram A illustrating buyer/supplier relationships among 17 companies located in various geographic locations. Upon receiving the entity diagram generating request from the data analyst, EDP system 190 may first retrieve the EDP data records 180-1 defining the 17 companies (entities) and the buyer/supplier relationships (relationships) among the companies in the requested entity diagram from EDP database 180.

Next, EDP system 190 may generate the initial version of entity diagram A by laying out the 17 companies and relationships according to one or more default rules. For example, EDP system 190 may place the companies in the initial version based on the alphabetical order of the company names with the relationship links among the companies. FIG. 2B shows an exemplary initial version 200 of entity diagram A consistent with certain disclosed embodiments.

As shown in FIG. 2B, in the example of the initialized entity diagram A with 17 companies, in one exemplary embodiment, the companies' names are in alphabetical order (e.g., Company A, Company B . . . Company Q). EDP system 190 may thus place the 17 companies in 3 columns with 6, 6, and 5 companies in each column with the relationships among the entities based on information retrieved from EDP data records 180-1.

In one exemplary embodiment, a relationship between two entities may be presented as a line connecting the two entities. The line connecting the two entities and representing the relationship may be referred to as a relationship link. Further, a relationship mark such as an arrow may be used at either or both ends of a relationship link to indicate whether the relationship is unidirectional or bi-directional. For example, in FIG. 2B, EDP system 190 may connect two companies by a relationship link originating from a "buyer" and including a relationship mark (an arrow in this example) pointing to a "supplier" to indicate a buyer/supplier relationship.

For example, based on the retrieved EDP data records 180-1, Company N is a supplier for Company A. Thus, as shown in FIG. 2B, EDP system 190 may link Company A and Company N with a relationship link and further mark with an arrow pointing to Company N. Similarly, Company M and Company Q are suppliers for Company B. As such, EDP system 190 may connect Companies B and M with a first relationship link with an arrow pointing to Company M. EDP system 190 may also connect Companies B and Q with a second relationship link with an arrow pointing to Company Q. The detailed relationships among the 17 companies are further depicted in FIG. 2B.

Referring back to FIG. 2A, EDP system 190 group the entities according to a first dimension of the requested entities (step 230) determined by default or by the data analyst (step 220). A dimension may refer to one or more attributes or characteristics of one or more entities or one or more entity relationships. A dimension may be defined by one or more attributes defined by EDP data records 180-1 corresponding to a set of entities or entity relationships.

In the example of entity diagram A with 17 companies, a dimension of the 17 companies (i.e., entities) may be the size of a company defined by its annual revenue. For example, the data analyst may determine that a company with annual revenue of over $1 billion is a large company, a company with annual revenue of less than $1 billion is a small company. Another dimension in the example of entity diagram A (of the 17 requested companies) may be the location of the companies defined by their headquarter locations. For example, the data analyst may determine that the state in which a company's headquarter is located may be used as the first dimension in the process of generating entity diagram A.

Figure 3:
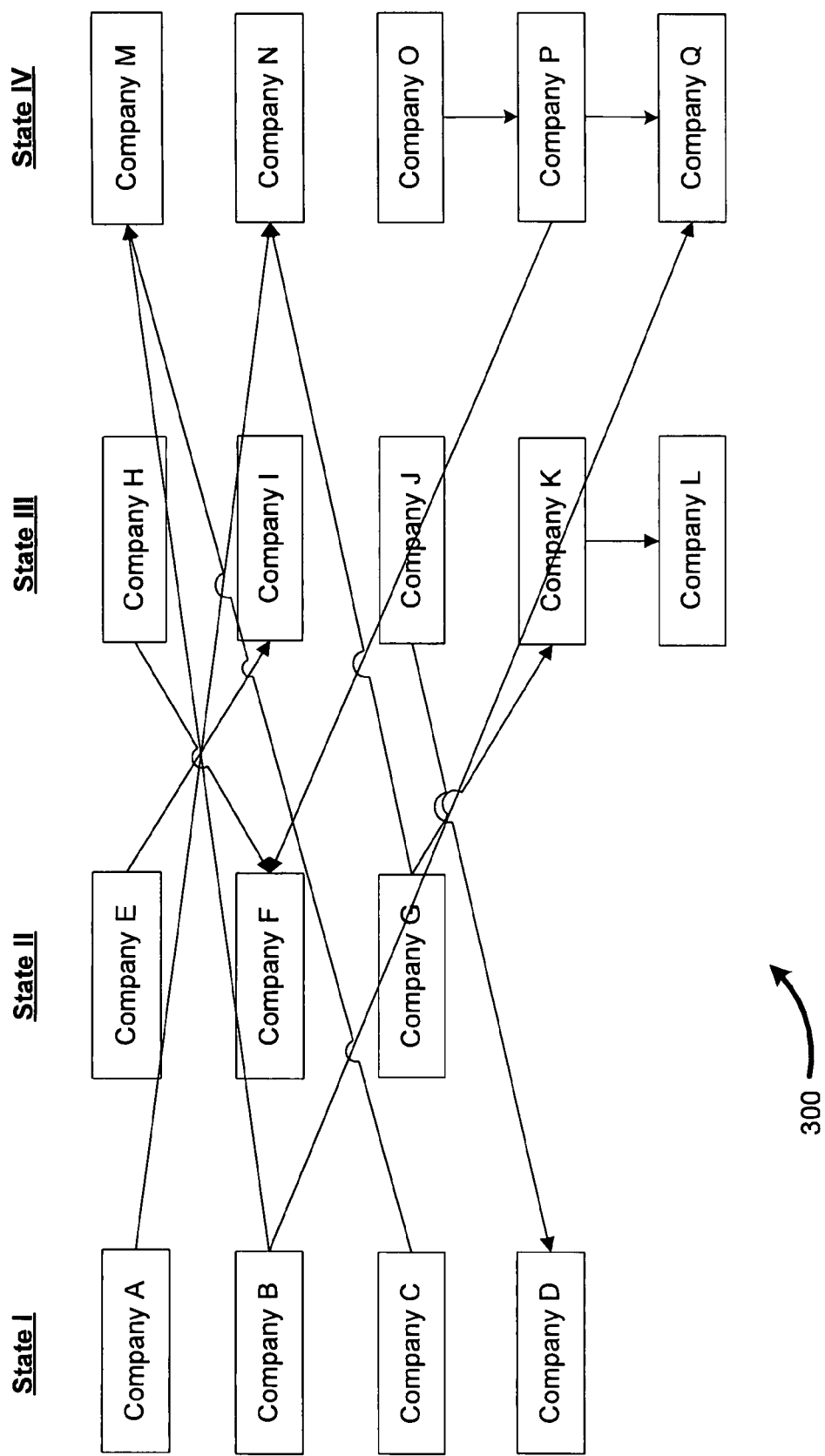
FIG. 3 is another exemplary entity diagram consistent with certain disclosed embodiments.

In the example of entity diagram A, if the data analyst selects headquarter location as the first dimension, or the headquarter location is the default first dimension of the entity diagram the data analyst requests to generate, EDP system 190 may then group the 17 companies based on their headquarter locations. FIG. 3 shows an exemplary grouping 300 of the entities based on the first dimension consistent with certain disclosed embodiments. As shown in FIG. 3, the 17 companies have their headquarters located in four states: State I, State II, State III, and State IV. EDP system 190 may therefore group the 17 companies according to their headquarter locations.

For example, as shown in FIG. 3, Companies A-D have their headquarters located in State I, and thus may be grouped together in the first column of entity diagram A; Companies E-G have their headquarters located in State II, and thus may be grouped together in the second column of entity diagram A; Companies H-L have their headquarters located in State III, and thus may be grouped together in the third column of entity diagram A; and Companies M-Q have their headquarters located in State IV, and thus may be grouped together in the fourth column of entity diagram A. EDP system 190 may determine the sequence of the grouping (e.g., the columns for State I, State II, State III, and State IV) by a default rule, such as grouping by the alphabetic order of the group names. Alternatively, EDP system 190 may enable a user to specify one or more rules to determine the sequence of the grouping.

The relationships among the 17 companies (i.e., the buyer/supplier relationships) may stay the same before and after the entities are grouped by the first dimension. As shown in FIGS. 2B and 3, for example, Company A and Company N are connected by a relationship link with a relationship mark (i.e., an arrow) pointing to Company N in both versions of entity diagram A. Similarly, Companies B and M are connected with a relationship link with a relationship mark (i.e., an arrow) pointing to Company M, and Companies B and Q are connected with a relationship link with a relationship mark (i.e., an arrow) pointing to Company Q in both versions of entity diagram A.

Figure 4:
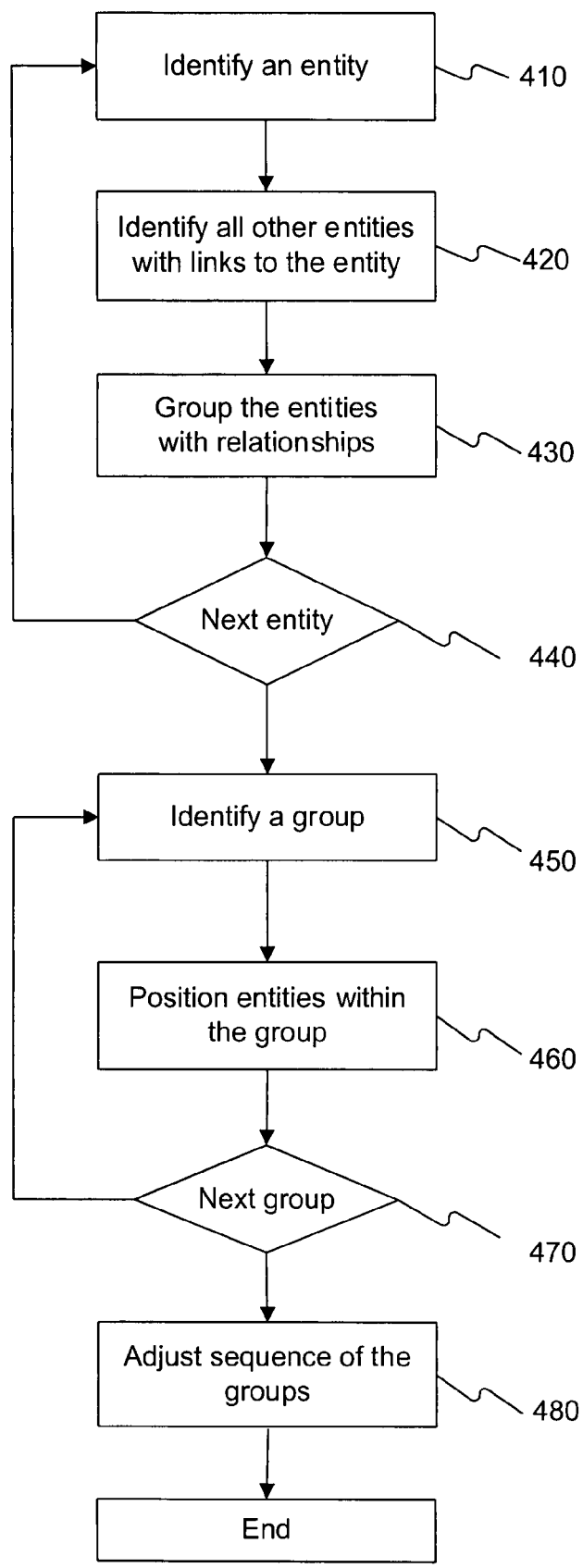
FIG. 4 is a flow chart of an exemplary process of grouping and rearranging entities in an entity diagram consistent with certain disclosed embodiments.

Returning to FIG. 2A, after grouping the entities by the first dimension, the EDP system 190 may group the entities according to a second dimension (step 240) determined by default or by the data analyst. FIG. 4 shows an exemplary process of grouping entities based on a second dimension consistent with certain disclosed embodiments. In the example of entity diagram A, EDP system 190 may further group the 17 companies based on the buyer/supplier relationship (the second dimension).

As shown in FIG. 4, EDP system 190 may start the grouping process by identifying a first entity (step 410). For example, EDP system 190 may start with Company A (FIG. 3). Next, EDP system 190 may identify all other entities with relationships to the first entity (step 420). In the example shown in FIG. 3, for example, the only other company with a buyer/supplier relationship with Company A is Company N. Further, Company N has a buyer/supplier relationship with Company G. Company G has a relationship with Company K, which in turn has a relationship with Company L. EDP system 190 may thus identify Companies A, G, L, K, and N in step 420.

Figure 5:
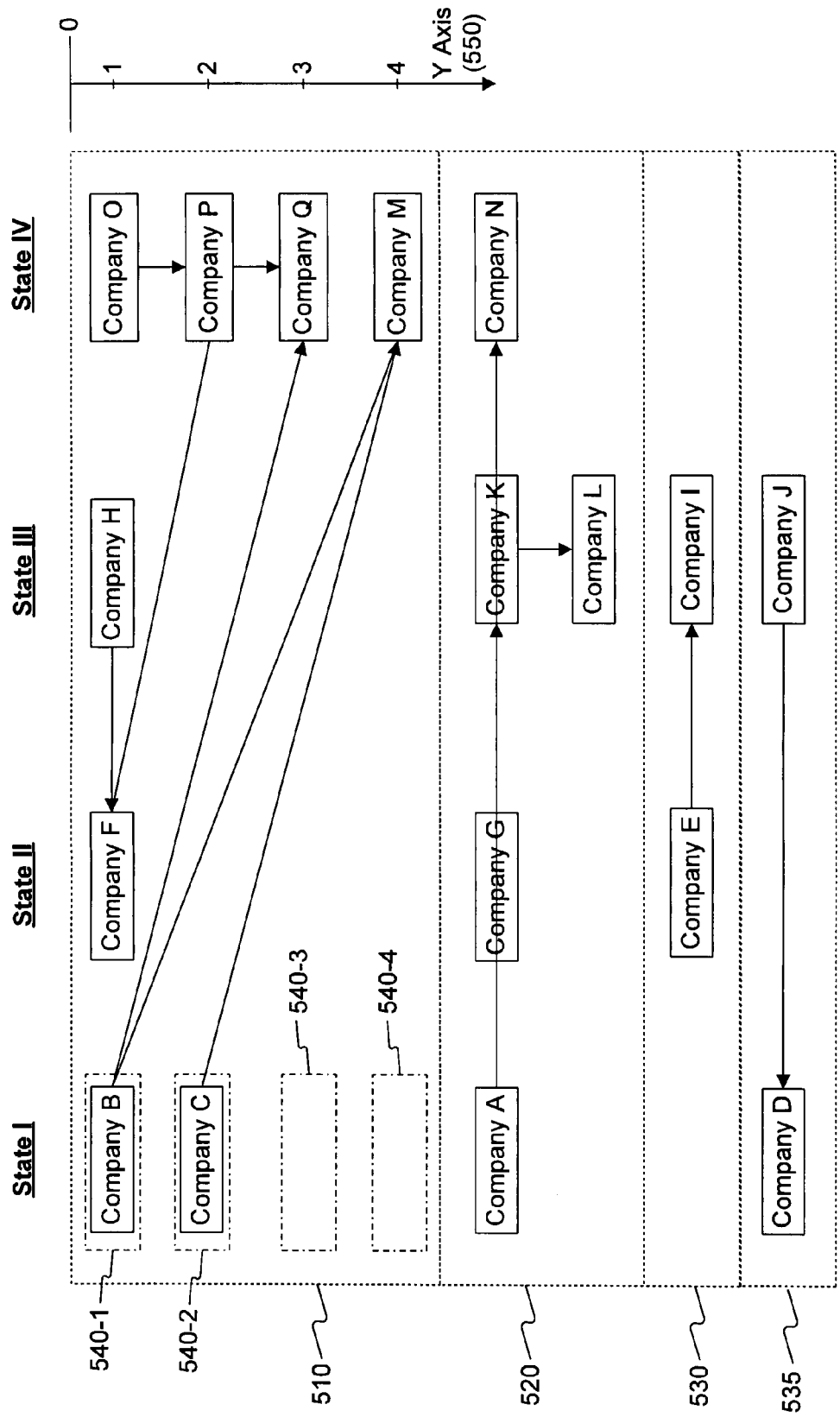
FIG. 5 is another exemplary entity diagram consistent with certain disclosed embodiments.

Next, EDP system 190 may group the entities with relationships in a group (step 430). FIG. 5 shows an exemplary entity diagram 500 with four groups 510, 520, 530, and 535 according to a first and a second dimension consistent with certain disclosed embodiments. As shown in FIG. 5, in the case of Companies A, G, L, K, and N, EDP system 190 may group them together in group 520 based on the buyer/supplier relationships (the second dimension) among the five companies.

Returning to FIG. 4, after grouping together the identified entity (identified in step 410) and the entities which have relationships with the identified entity, EDP system 190 may repeat steps 410-430 to group all entities in the entity diagram (step 440). Once the entities are grouped according to the buyer/supplier relationships (i.e., the second dimension), EDP system 190 may further adjust positions of the entities within each one of groups 510, 520, 530, and 535.

EDP system 190 may start the repositioning process by identifying a first one of groups 510, 520, 530, and 535 along the second dimension (step 450). Referring to entity diagram 500 shown in FIG. 5, EDP system 190 may identify group 510 as the first group. Returning to FIG. 4, next, EDP system 190 may adjust positions of the entities within the identified group (step 460). The process of adjusting positions is further illustrated in FIG. 5. As shown in FIG. 5 (previously in FIG. 3), Companies B and C are the two entities in the first column (with headquarter locations in State I) in group 510. EDP system 190 may determine that there are four possible positions 540-1, 540-2, 540-3, and 540-4 for Companies B and C within group 510.

In one exemplary embodiment, EDP system 190 may further reposition the companies in their possible positions (within the same column) so that they are adjusted to the top of the group. For example, EDP system 190 may define the depth of group 510 by using a Y axis 550 to measure the position of each company in group 510. EDP system 190 may then define the depth of position 540-1 as +1, the depth of position 540-2 as +2, the depth of position 540-3 as +3, and the depth of position 540-4 as +4, when measured along Y axis 550. EDP system 190 may similarly determine the depths for possible positions for other entities (Companies F, H, O, P, Q, and M) in group 510.

After determining the depths of all possible positions for all entities (i.e., Companies B, C, F, H, O, P, Q and M), EDP system 190 may calculate the total depth for each possible group layout for group 510. A group layout refers to a specific arrangement of entities within a group with each entity placed in one of its possible positions in the group. The total depth for a group layout may be defined as to the sum of depths for all entities' positions in the layout (total depth=Σ depths). For example, in FIG. 5, the total depth of the group layout as shown in group 510 is 15 (Σ depths of Companies B, C, F, H, O, P, Q and M=1+2+1+1+1+2+3+4=15).

After calculating the total depth for each possible group layout, in one embodiment, EDP system 190 may then select the group layout with the minimum total depth. As shown in FIG. 5, the total depth of the group layout as shown for group 510 is 15, which is the minimum total depth of all possible group layouts for group 510. EDP system 190 may thus select the group layout as shown in FIG. 5 as the layout for group 510.

Returning to FIG. 4, after adjusting the positions of entities in one group by selecting a group layout with the minimum total depth (group 510), EDP system 190 may then repeat steps 450 and 460 for all groups according to the second dimension (step 470). As shown in FIG. 5, EDP system 190 may repeat steps 450 and 460 of adjusting the positions of companies within a group for groups 520, 530, and 535 (groups according to the second dimension).

After adjusting the positions within all groups (510, 520, 530, and 535) according to the second dimension, EDP system 190 may then adjust the sequence of groups 510, 520, 530, and 535 in entity diagram 500 (step 480). In one exemplary embodiment, EDP system 190 may determine to place a group with more entities on top or on bottom of another group with fewer entities. As example shown in FIG. 5, group 510 contains 8 entities; group 520 contains 5 entities; groups 530 and 535 each contains two entities. Accordingly, EDP system 190 may place groups 510, 520, 530, and 535 in the sequence shown in FIG. 5.

Returning to FIG. 2A, after grouping the entities based on a second dimension (i.e., the buyer/supplier relationship), EDP system 190 may adjust the grouping order according to the first dimension (i.e., headquarter location) (step 250). The process for rearranging the groups according to the first dimension is further depicted in FIG. 6.

Figure 6:
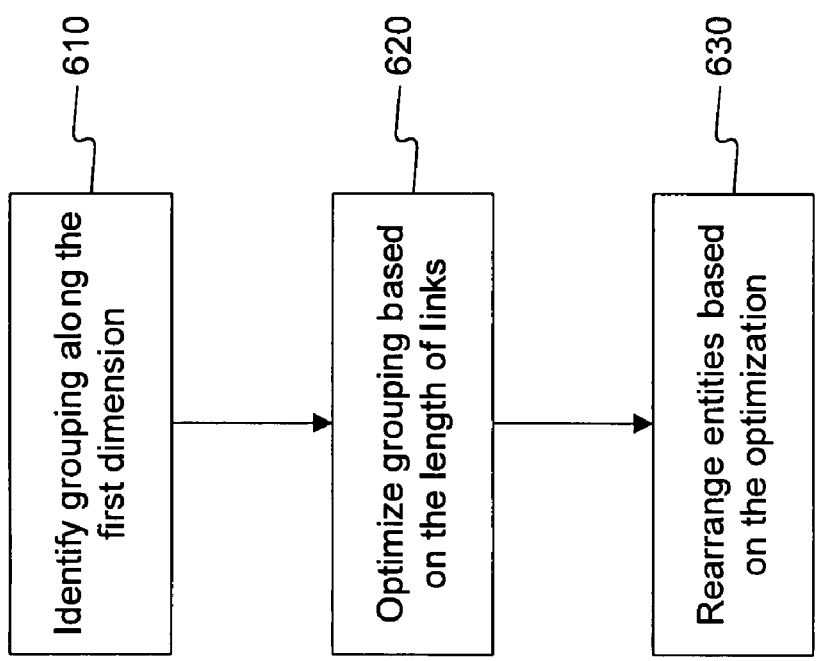
FIG. 6 is a flow chart of another exemplary process of rearranging entities in an entity diagram consistent with certain disclosed embodiments.

As shown in FIG. 6, EDP system 190 may first identify the groups according to the first dimension in the entity diagram (step 610). In the example of entity diagram A, the first dimension is the headquarter location (see FIG. 2A, step 220). The 17 companies are grouped into four groups (i.e., State I, State II, State III, and State IV) based on the first dimension (FIG. 2A, step 230).

Figure 7:
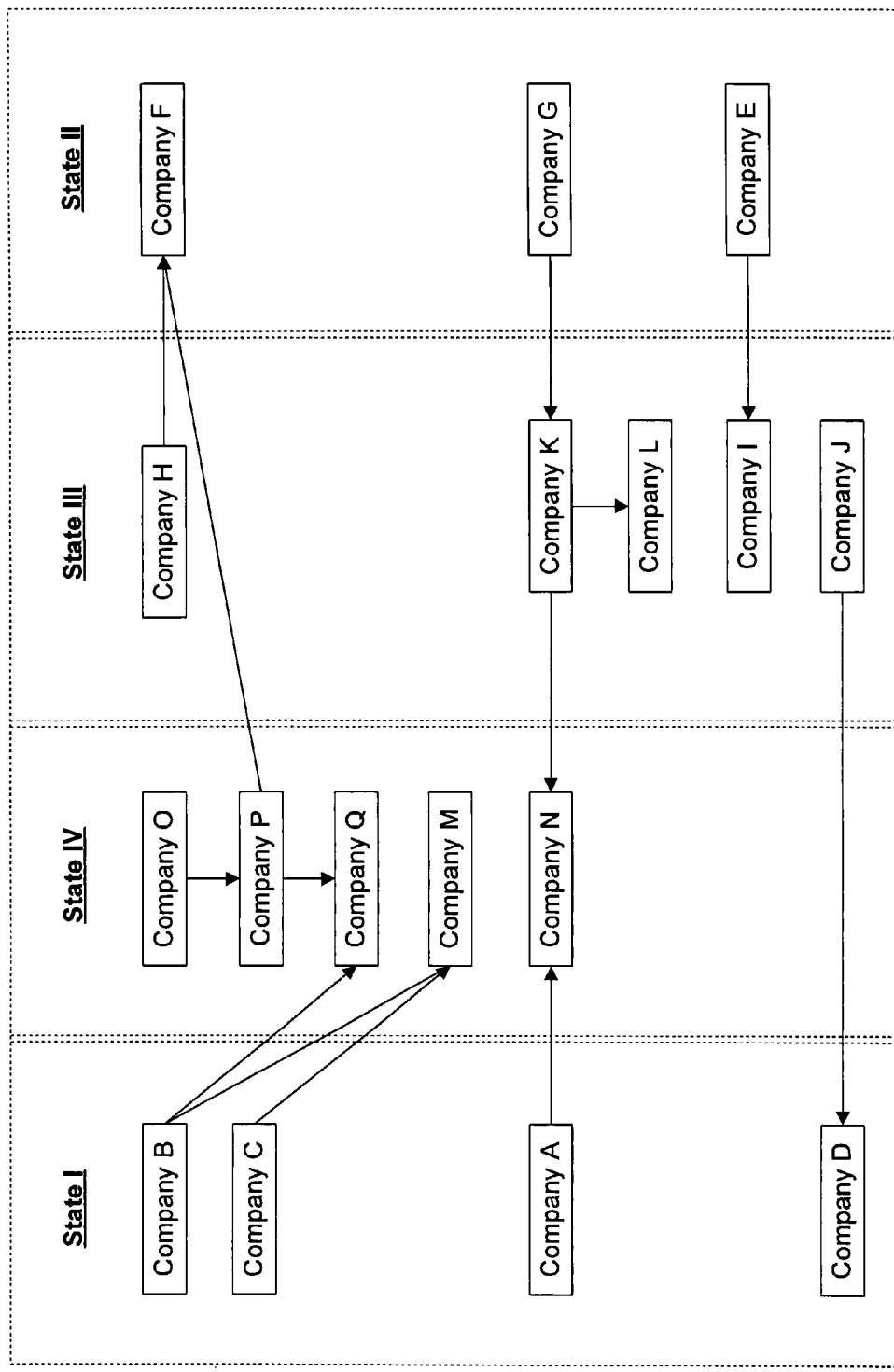
FIG. 7 is another exemplary entity diagram consistent with certain disclosed embodiments.

Next, as shown in FIG. 6, EDP system 190 may optimize the sequence of the groups according to the first dimension in the entity diagram (step 620). For example, in exemplary entity diagram 500 in FIG. 5, the sequence of the groups is State I, State II, State III, and State IV from left to right. EDP system 190 may calculate a total length of the relationship links (Σ length of relationship links) for the layout of entity diagram A as set forth in diagram 500 shown in FIG. 5. EDP system 190 may then adjust the sequence of the groups, for example, to State I, State IV, State III, and State II from left to right, and calculate the total length of the relationship links for the layout. EDP system 190 may thus calculate the total length of relationship links for all permutations (4×3×2=24) of the groups along the first dimension (e.g., States I, II, IV, III; I, III, IV, II; etc.), and select the grouping equence with the minimum total length of relationship links as a preferred layout. FIG. 7 shows a selected grouping sequence 700 for entity diagram A consistent with certain disclosed embodiments.

In FIG. 7, in the example of entity diagram A, EDP system 190 may determine that the grouping sequence of State I, State IV, State III, and State II (groups according to the first dimension) is the entity diagram layout with the minimum total length of relationship links. As shown in FIG. 7, EDP system 190 may therefore select the grouping sequence of State I, State IV, State III, and State II.

Figure 8A:
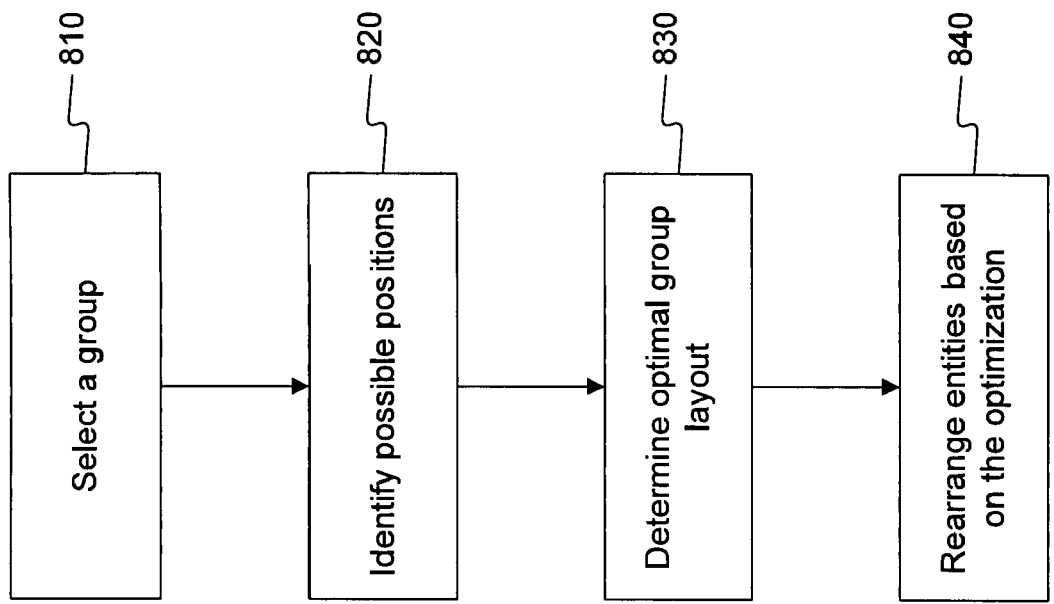
FIG. 8A is a flow chart of another exemplary process of rearranging entities in an entity diagram consistent with certain disclosed embodiments.

Returning to FIG. 2A, after rearranging the grouping sequence according to the first dimension, EDP system 190 may further rearrange the entities within the groups according to the second dimension (i.e., the buyer/supplier relationship) (step 260). FIG. 8A illustrates the detailed process for rearranging the entities based on the groupings of the second dimension consistent with certain disclosed embodiments.

Figure 9:
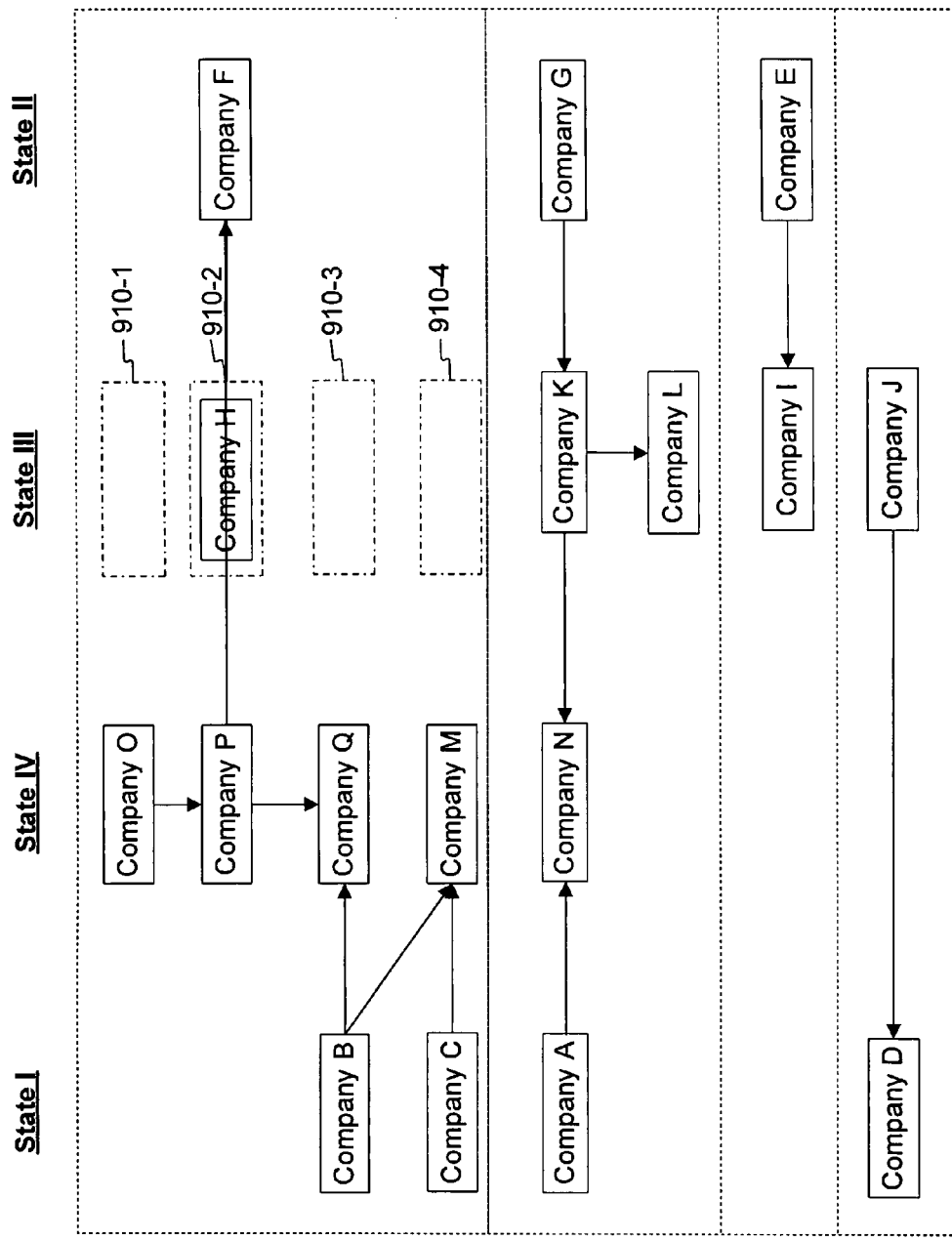
FIG. 9 is another exemplary entity diagram consistent with certain disclosed embodiments.

As shown in FIG. 8A, EDP system 190 may first identify a group to start the process (step 810). FIG. 9 illustrates an exemplary entity diagram 900 after EDP system 190 rearranges the entities in the groups based on the second dimension consistent with certain disclosed embodiments. In one exemplary embodiment, EDP system 190 may start with the group closest to the top of the entity diagram, i.e., group 510, in FIG. 9.

Next, as shown in FIG. 8A, EDP system 190 may determine the possible positions for the entities in the selected group based on the second dimension (step 820). In the example of entity diagram A, as shown in FIG. 9, EDP system 190 may identify all possible positions within group 510 for the companies within the group. For example, Company H may be placed at four possible positions, 910-1, 910-2, 910-3, and 910-4.

Referring to FIG. 8A, next, EDP system 190 may determine the optimal group layout for the group based on the possible positions (step 830). In one exemplary embodiment, the optimization may be based on the total length of relationship links of each group layout. For example, in FIG. 9, for group 510, EDP system 190 may determine the total length of relationship links for all possible group layouts and select the group layout with the minimum total length of relationship links. EDP system 190 may determine the total length of relationship links for all group layouts by determining the total lengths corresponding to all possible positions for all entities in a group.

Figure 8B:
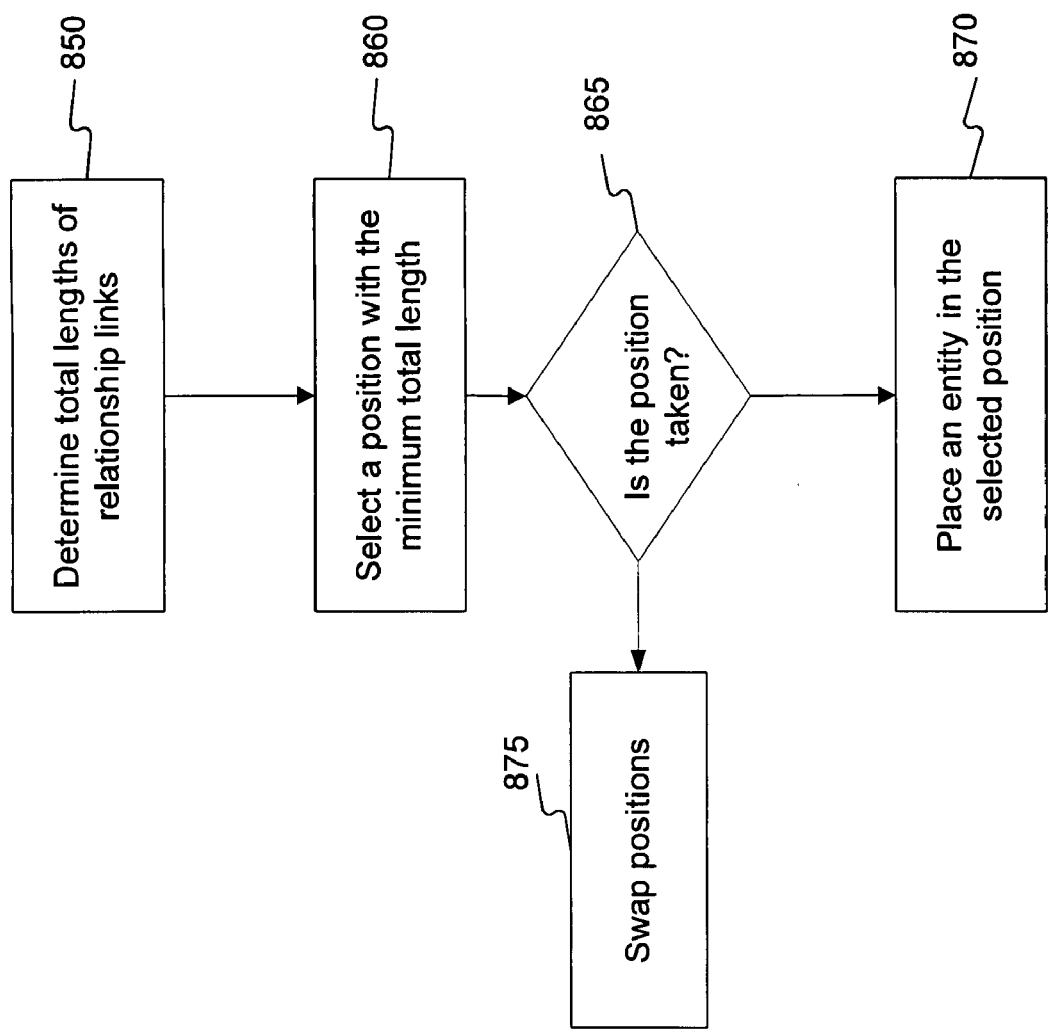
FIG. 8B is a flow chart of another exemplary process of rearranging entities in an entity diagram consistent with certain disclosed embodiments.

FIG. 8B further illustrates an exemplary process for placing an entity in a selected possible position in a group layout consistent with certain disclosed embodiments. EDP system 190 may first determine a first total length of relationship links if Company H is placed in position 910-1 (step 850). As shown in FIG. 9, for group 510, EDP system 190 may determine the first total length of relationship links by summing the lengths of relationship links between companies B and Q, B and M, C and M, O and P, P and Q, P and F, and H and F, while assuming Company H is placed in position 910-1. EDP system 190 may also determine a second total length of relationship links while assuming Company H is placed in position 910-2. EDP system 190 may also determine a third total length of relationship links while assuming Company H is placed in position 910-3. EDP system 190 may also determine a forth total length of relationship links while assuming Company H is placed in position 910-4. Based on the total lengths of relationship links for all possible positions (910-1, 910-2, 910-3, and 910-4), EDP system 190 may select the possible position with the minimum total length of relationship links (step 860). As shown in FIG. 9, EDP system 190 may determine that position 910-2 corresponds to the minimum total length of relationship links. EDP system 190 may check whether another entity has already been placed in the position with the minimum total length of relationship links (which is position 910-2 for group 510) (step 865). If the position 910-2 is not taken by another entity, EDP system 190 may then move Company H to position 910-2 (step 870).

In certain embodiments, the selected position for a first entity (i.e., 910-2) with minimum total length of relationship links may already contain a second entity, EDP system 190 may then swap the positions of the first and the second entities by placing the first entity in the selected position with minimum total length of relationship links, and then placing the second entity in the first entity's previous position (step 880).

Referring to group 510 in FIG. 9, after placing Company H in position 910-2, EDP system 190 may repeat steps 850, 860, 865, 870, and 875 for all other entities (Companies B, C, O, P, Q, M, and F) in group 510 to place all entities in group 510 in their selected positions. As shown in FIG. 9, EDP system 190 may select an optimal group layout for group 510 after placing all entities (eight companies) in the group in their selected positions (FIG. 8A, step 830)

Referring to FIG. 8A, EDP system 190 may repeat steps 810, 820, and 830 for all groups along the second dimension. In the example of entity diagram A, as shown in FIG. 9, EDP system 190 may repeat steps 810, 820, and 830 for groups 520, 530, and 535. After determining the optimal group layout for each group along the second dimension, EDP system 190 may place the entities according to the selected group layouts (step 840). For the example of entity diagram A, the rearranged entity diagram is shown in FIG. 9 with all 17 companies placed according to the selected group layouts for groups 510, 520, 530, and 535.

Returning to FIG. 2A, after rearranging the entities within the groups along the second dimension, EDP system 190 may adjust relationship links and connection points to further improve the layout of the entity diagram (step 270). A connection point refers to a position on a node or textbox (denoting an entity) where a relationship link may originate from or terminate at the node. A node or textbox denoting an entity may have one or more connection points.

Figure 10:
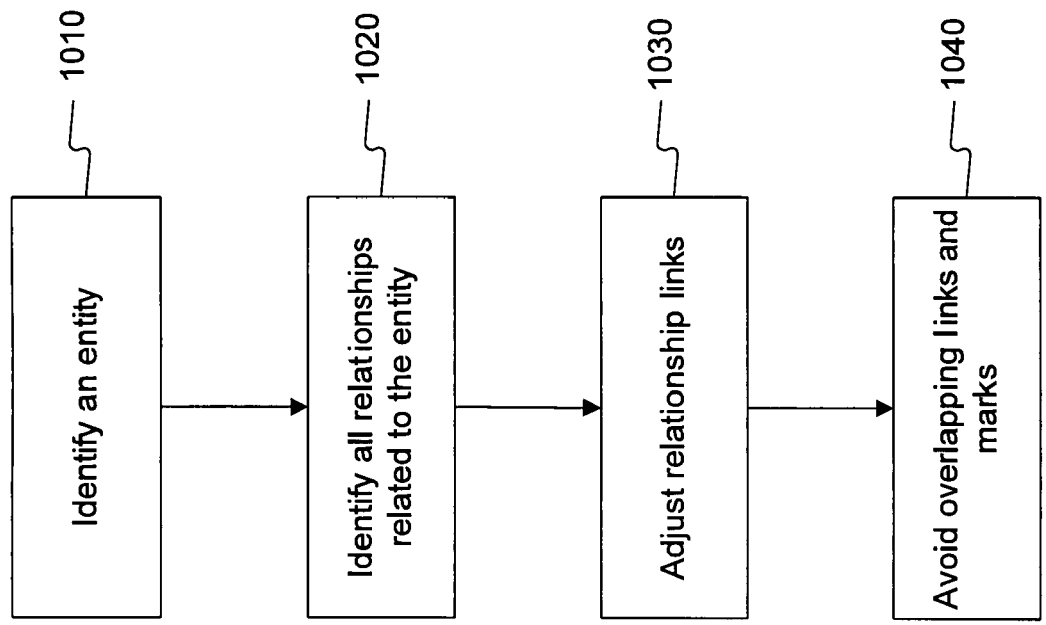
FIG. 10 is a flow chart of another exemplary process of adjusting relationship links in an entity diagram.
Figure 11:
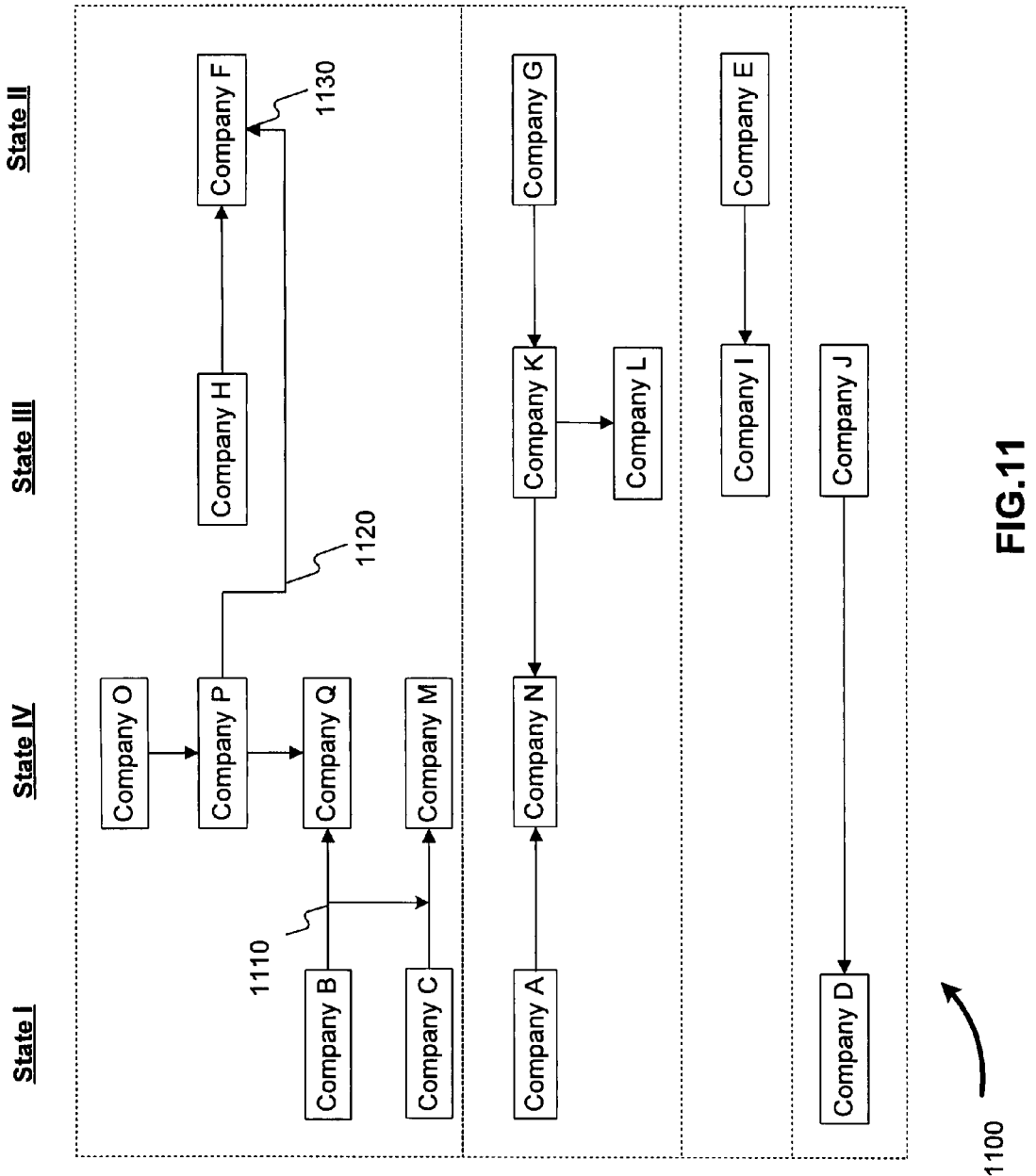
FIG. 11 is another exemplary entity diagram consistent with certain disclosed embodiments.

FIG. 10 shows an exemplary process of adjusting relationship links and connection points in an entity diagram consistent with certain disclosed embodiments. FIG. 11 illustrates an exemplary entity diagram 1100 after EDP system 190 adjusts the relationship links and connections. As shown in FIG. 10, EDP system 190 may start by identifying a first entity to adjust the relationship links and connection points (step 1010). In one exemplary embodiment, EDP system 190 may identify the first entity from the top in the leftmost column of an entity diagram. For example, in FIG. 11, EDP system 190 may start with Company B.

Returning to FIG. 10, next, EDP system 190 may identify all relationships associated with the selected entity (step 1020). In exemplary entity diagram 1100, as shown in FIG. 11, after identifying Company B, EDP system 190 may identify all relationships between Company B and other companies. In FIG. 11, EDP system 190 may identify two relationships associated with Company B: a first relationship between Company B and Company M, and a second relationship between Company B and Company Q (Companies M and Q are suppliers for Company B).

Next, as shown in FIG. 10, EDP system 190 may adjust the identified relationship links (step 1030). EDP system 190 may first adjust relationship links for one-to-one relationships. In the example of entity diagram 1100, as shown in FIG. 11, Company B does not have any one-to-one relationship. EDP system 190 may thus move to the next step to adjust other types of relationship links associated with Company B.

Next, EDP system 190 may adjust relationship links for one-to-many and many-to-many relationships. In exemplary entity diagram 1100 shown in FIG. 11, for example, EDP system 190 may adjust the one-to-many relationship among Companies B, M, and Q. EDP system 190 may adjust the relationship links by minimizing the number of turning points in the two relationship links. As shown in FIG. 11, EDP system 190 may draw the relationship link between Companies B and M and the relationship link between Companies B and Q using the same turning point 1110.

Returning to FIG. 10, EDP system 190 may repeat steps 1010, 1020, and 1030 for all entities in the entity diagram. In exemplary entity diagram 1100 shown in FIG. 11, after EDP system 190 adjusts relationship links associated with Company B, it may identify Company C as the next entity (step 1010). EDP system 190 may then identify all relationship links associated with Company C (step 1020). Next, as shown in FIG. 10, EDP system 190 may adjust the identified relationship links associated with Company C (step 1030). EDP system 190 may first adjust relationship links for one-to-one relationships. As shown in FIG. 11, Company C has only a one-to-one relationship with Company M. EDP system 190 may thus connect (or delete the old link and reconnect) the two companies (Companies C and M) with the minimum number of turning points in the relationship links. In the example of Companies C and M, EDP system 190 may therefore directly connect Company C and Company M (zero turning point). Similarly, EDP system 190 may repeat steps 1010, 1020, and 1030 and adjust relationship links for all other entities (Companies A and D-Q) in exemplary entity diagram 1100.

EDP system 190 may also adjust relationship links to remove overlapping relationship marks and/or overlapping relationship links in the entity diagram (step 1040). For example, referring back to FIG. 9, both Company P and Company H have buyer/supplier relationships with company F. In FIG. 9, there is an overlap of relationship links and relationship marks (e.g, arrows) between Company H and Company F. EDP system 190 may adjust the relationship links and the relationship marks (arrows) to avoid such overlap.

As shown in exemplary diagram 1100 in FIG. 11, to eliminate overlapping relationship links and relationship marks, EDP system 190 may add one or more turning points (e.g., 1120) to a relationship link. Further, depending on the positions of the entities, EDP system 190 may adjust the connection points (e.g., 1130) of a relationship link. Again referring back to FIG. 9, two relationship links from Companies P and H point to Company F with overlapping relationship links and relationship marks (arrows). To avoid confusion and overlapping relationship links and relationship marks, EDP system 190 may determine that an additional connection point 1130 may be used. As shown in FIG. 11, EDP system 190 may adjust the relationship link between Company P and Company F to terminate at connection point 1130 to avoid overlapping relationship marks (arrows). In other scenarios, EDP system 190 may similarly change connection points (e.g., either originating or terminating connection points) for one or more entities as well as for one or more relationship links in an entity diagram.

Methods and systems consistent with the disclosed exemplary embodiments may be used together with other software programs to provide clearer and more understandable entity relationship diagrams. For example, EDP system 190 may be implemented to clarify entity diagrams generated by another software program, such as a data modeling tool, to provide a more user-friendly version of the diagram.

The disclosed embodiments may also be implemented as a stand-alone graphic design or data modeling system. A user may generate entity diagrams directly from EDP system 190 through a user interface. The user may also use EDP system 190 to optimize the designs and the presentations for various diagrams and models. For example, a data modeler may create large scale data models using the disclosed embodiments. The data modeler may further use EDP system 190 to improve the layout of the data model and identify problems in the data model.

It will be apparent to those skilled in the art that various modifications and variations can be made in the disclosed exemplary embodiments without departing from the scope of the disclosure. Additionally, other embodiments of the disclosed system will be apparent to those skilled in the art from consideration of the specification. It is intended that the specification and examples be considered as exemplary only, with a true scope of the disclosure being indicated by the following claims and their equivalents.

What is claimed is:

1. A system for generating an entity diagram, comprising:
a memory to store program code; and
a processor to execute the program code to perform a process to generate the entity diagram, the process comprising:
generating the entity diagram with one or more entities and one or more relationships;
grouping the one or more entities by a first dimension into one or more groups, wherein the first dimension corresponds to a first attribute of the one or more entities;
grouping the one or more entities by a second dimension into one or more groups, wherein the second dimension corresponds to a second attribute of the one or more entities;
rearranging the entities based on the grouping according to the first dimension by determining a total length of relationship links in the entity diagram;
rearranging the entities based on the grouping according to the second dimension by determining a minimum total length of relationship links in the entity diagram, comprising:
selecting a first possible position for a first entity within a selected one of the second dimension groups;
determining a first total length of relationship links associated with the first possible position;
selecting a second possible position for the first entity within the selected one of the second dimension groups;
determining a second total length of relationship links associated with the second possible position; and
determining the minimum total length of relationship links based on at least the first total length of relationship links and the second total length of relationship links;
adjusting one or more relationship links corresponding to the one or more relationships; and
providing an updated entity diagram.

2. The system of claim 1, wherein the process further comprises:
determining the first dimension; and
determining the second dimension.

3. The system of claim 1, wherein the rearranging the entities based on the grouping according to the second dimension further comprises:
comparing the first total length of relationship links and the second total length of relationship links; and
repositioning the first selected entity based on a result of the comparison.

4. The system of claim 1, wherein the grouping the one or more entities by a second dimension into one or more groups further comprises:
positioning one or more entities within a selected one of the second dimension groups based on a total depth of the group.

5. The system of claim 4, wherein the rearranging the entities based on the grouping according to the second dimension further comprises:
repositioning the one or more entities within the selected group based on a total length of relationship links.

6. The system of claim 1, wherein the adjusting one or more relationship links corresponding to the one or more relationships further comprises:
adjusting one or more relationship marks.

7. The system of claim 6, wherein the adjusting one or more relationship links corresponding to the one or more relationships further comprises:
adjusting one or more connection points.

8. The system of claim 7, wherein the adjusting one or more relationship links corresponding to the one or more relationships further comprises:
adding or deleting one or more turning points.

9. The system of claim 1, wherein the adjusting one or more relationship links corresponding to the one or more relationships further comprises:
determining whether a relationship is a one-to-one relationship.

10. The system of claim 9, wherein the adjusting one or more relationship links corresponding to the one or more relationships further comprises:
  connecting two entities corresponding to the one-to-one relationship with a minimal number of turning points.

11. The system of claim 9, wherein the adjusting one or more relationship links corresponding to the one or more relationships further comprises:
  determining positions of one or more entities associated with the relationship; and
  connecting the one or more entities with a minimal number of turning points.

12. The system of claim 11, wherein the adjusting one or more relationship links corresponding to the one or more relationships further comprises:
  identifying one or more overlapping relationship links; and
  adjusting the identified relationship links.

13. The system of claim 11, wherein the adjusting one or more relationship links corresponding to the one or more relationships further comprises:
  identifying one or more overlapping relationship marks; and
  adjusting the identified relationship marks.

14. The system of claim 1, wherein the process further comprises:
  ordering groups along the first dimension by a first rule.

15. The system of claim 5, wherein the repositioning the one or more entities within the selected group based on a total length of relationship links further comprises:
  determining possible positions of the one or more entities;
  determining total lengths of relationship links corresponding to the possible positions;
  determining a group layout based on the total lengths of relationship links for the possible positions; and
  repositioning the one or more entities based on the group layout.

16. The system of claim 5, wherein the repositioning the one or more entities within the selected group based on a total length of relationship links further comprises:
  determining possible positions of the one or more entities;
  determining total lengths of relationship links corresponding to the possible positions;
  swapping positions of two entities;
  determining a group layout based on the total lengths of relationship links for the possible positions; and
  repositioning the one or more entities based on the group layout.

17. A method for generating an entity diagram, comprising:
  performing a process for generating the entity diagram through an interaction of a user with an entity diagram presentation architecture, the process including:
    generating the entity diagram with one or more entities and one or more relationships;
    grouping the one or more entities by a first dimension into one or more groups, wherein the first dimension corresponds to a first attribute of the one or more entities;
    grouping the one or more entities by a second dimension into one or more groups, wherein the second dimension corresponds to a second attribute of the one or more entities;
    rearranging the entities based on the grouping according to the first dimension by determining a total length of relationship links in the entity diagram;
    rearranging the entities based on the grouping according to the second dimension by determining a minimum total length of relationship links in the entity diagram, comprising:
      selecting a first possible position for a first entity within a selected one of the second dimension groups;
      determining a first total length of relationship links associated with the first possible position;
      selecting a second possible position for the first entity within the selected one of the second dimension groups;
      determining a second total length of relationship links associated with the second possible position; and
      determining the minimum total length of relationship links based on at least the first total length of relationship links and the second total length of relationship links;
    adjusting one or more relationship links corresponding to the one or more relationships; and
    providing an updated entity diagram.

18. The method of claim 17, wherein the process further comprises:
  determining the first dimension; and
  determining the second dimension.

19. The method of claim 17, wherein the rearranging the entities based on the grouping according to the second dimension further comprises:
  comparing the first total length of relationship links and the second total length of relationship links; and
  repositioning the first selected entity based on a result of the comparison.

20. The method of claim 17, wherein the rearranging the entities based on the grouping according to the second dimension further comprises:
  positioning one or more entities within a selected one of the second dimension groups based on a total depth of the group.

21. The method of claim 20, wherein the rearranging the entities based on the grouping according to the second dimension further comprises:
  repositioning the one or more entities within the selected group based on a total length of relationship links.

22. The method of claim 17, wherein the adjusting one or more relationship links corresponding to the one or more relationships further comprises:
  adjusting one or more relationship marks.

23. The method of claim 22, wherein the adjusting one or more relationship links corresponding to the one or more relationships further comprises:
  adjusting one or more connection points.

24. The method of claim 23, wherein the adjusting one or more relationship links corresponding to the one or more relationships further comprises:
  adding or deleting one or more turning points.

25. The method of claim 17, wherein the process further comprises:
  ordering groups along the first dimension by a first rule.

26. The method of claim 17, wherein the adjusting one or more relationship links corresponding to the one or more relationships further comprises:
  determining whether a relationship is a one-to-one relationship.

27. The method of claim 26, wherein the adjusting one or more relationship links corresponding to the one or more relationships further comprises:

connecting two entities corresponding to the one-to-one relationship with a minimal number of turning points.

28. The system of claim 26, wherein the adjusting one or more relationship links corresponding to the one or more relationships further comprises:
    determining positions of one or more entities associated with the relationship; and
    connecting the one or more entities with a minimal number of turning points.

29. The system of claim 28, wherein the adjusting one or more relationship links corresponding to the one or more relationships further comprises:
    identifying one or more overlapping relationship links; and
    adjusting the identified relationship links.

30. The system of claim 28, wherein the adjusting one or more relationship links corresponding to the one or more relationships further comprises:
    identifying one or more overlapping relationship marks; and
    adjusting the identified relationship marks.

31. The method of claim 21, wherein the repositioning the one or more entities within the selected group based on a total length of relationship links further comprises:
    determining possible positions of the one or more entities;
    determining total lengths of relationship links corresponding to the possible positions;
    determining a group layout based on the total lengths of relationship links for the possible positions; and
    repositioning the one or more entities based on the group layout.

32. The method of claim 21, wherein the repositioning the one or more entities within the selected group based on a total length of relationship links further comprises:
    determining possible positions of the one or more entities;
    determining total lengths of relationship links corresponding to the possible positions;
    swapping positions of two entities;
    determining a group layout based on the total lengths of relationship links for the possible positions; and
    repositioning the one or more entities based on the group layout.

33. A method for generating an entity diagram, comprising:
    generating the entity diagram with one or more entities and one or more relationships;
    grouping the one or more entities by a first dimension into one or more groups, wherein the first dimension corresponds to a first data attribute of the one or more entities;
    grouping the one or more entities by a second dimension into one or more groups, wherein the second dimension corresponds to a second data attribute of the one or more entities;
    rearranging the entities based on the grouping according to the first dimension by determining a total length of relationship links in the entity diagram;
    rearranging the entities based on the grouping according to the second dimension by determining a minimum total length of relationship links in the entity diagram, comprising:
        selecting a first possible position for a first entity within a selected one of the second dimension groups;
        determining a first total length of relationship links associated with the first possible position;
        selecting a second possible position for the first entity within the selected one of the second dimension groups;
        determining a second total length of relationship links associated with the second possible position; and
        determining the minimum total length of relationship links based on at least the first total length of relationship links and the second total length of relationship links;
    adjusting one or more relationship links corresponding to the one or more relationships; and
    providing an updated entity diagram.

34. The method of claim 33, wherein the one or more relationships are associated with the one or more entities.

35. The method of claim 34, wherein the second dimension is a second attribute associated with the one or more relationships.

* * * * *